Feb. 9, 1960
A. J. MANGINI
2,924,231
COMPARTMENT VALVE CONSTRUCTION
Filed Feb. 11, 1957
2 Sheets-Sheet 1
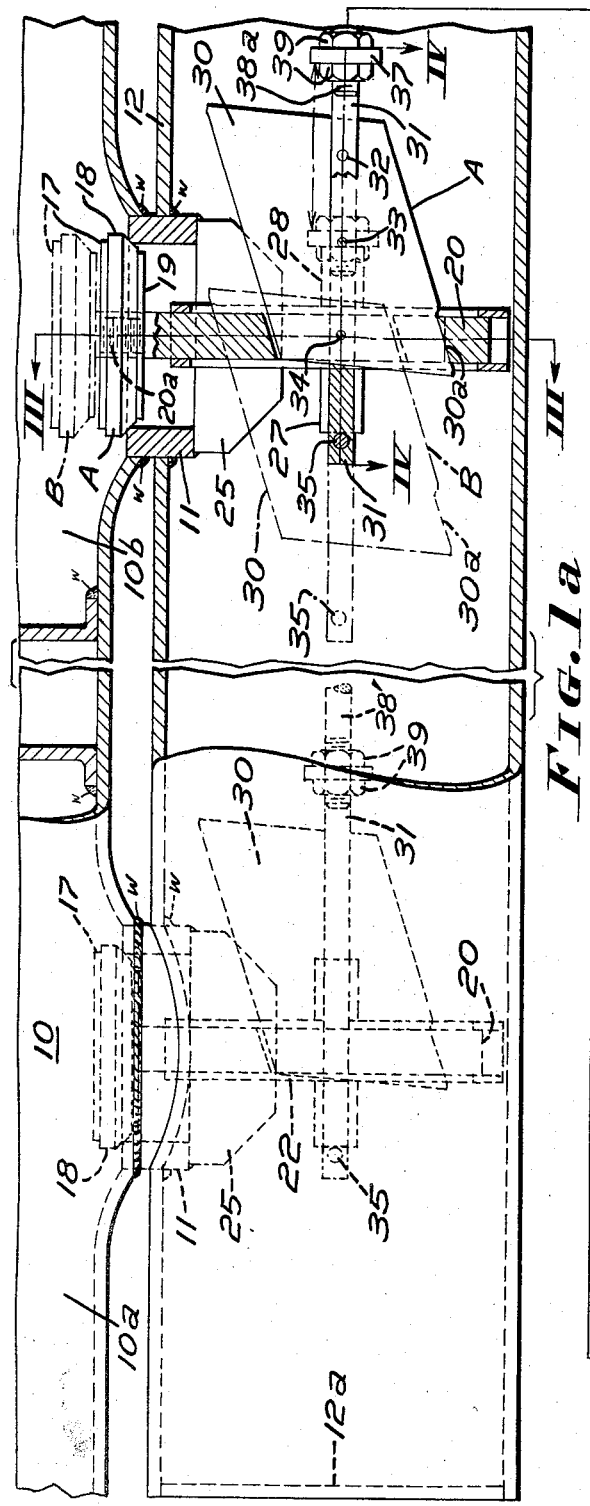
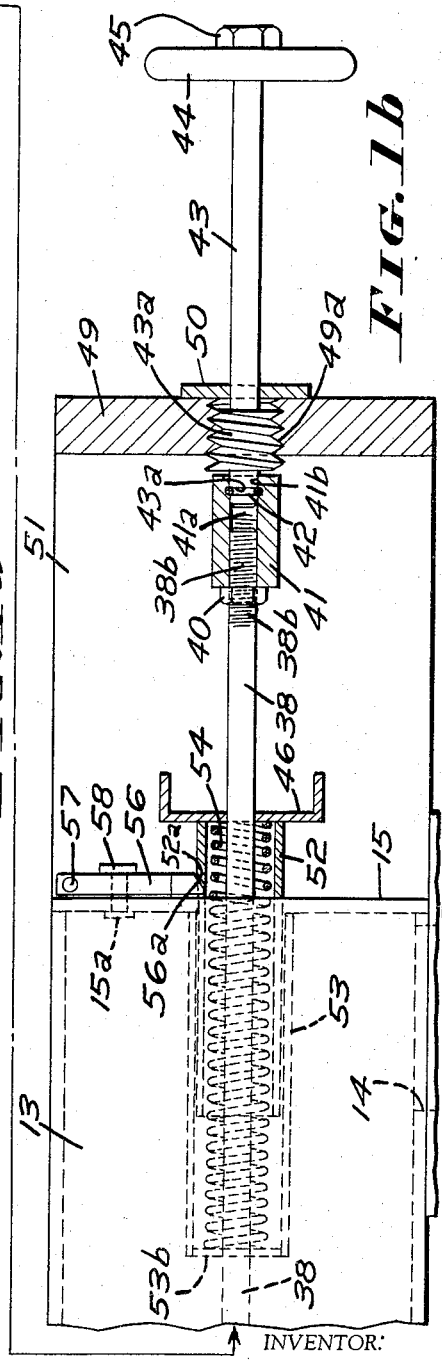
INVENTOR:
Andrew J. Mangini
BY:
Green, McCallister & Miller
HIS ATTORNEYS.

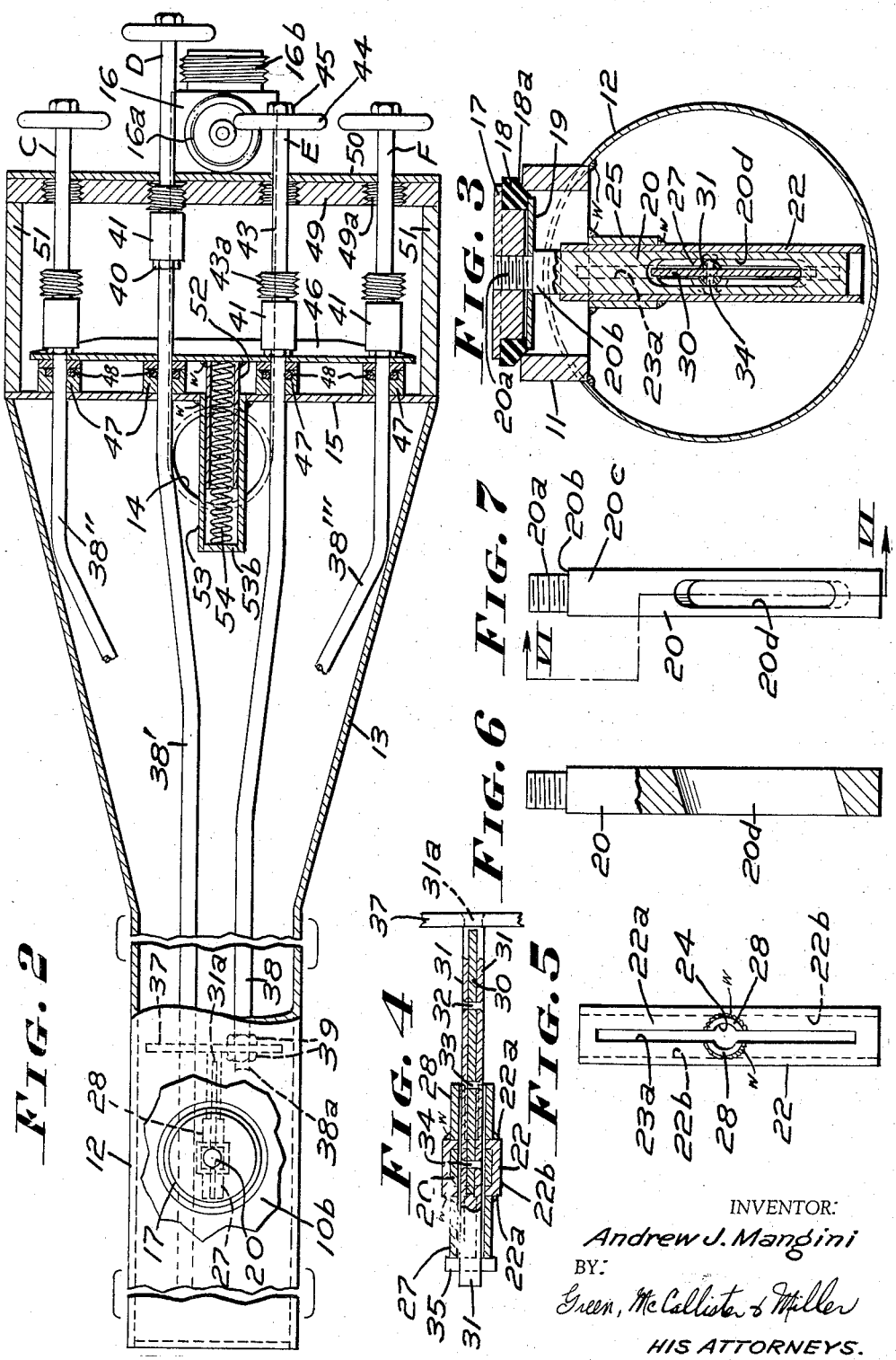

United States Patent Office

2,924,231
Patented Feb. 9, 1960

2,924,231

COMPARTMENT VALVE CONSTRUCTION

Andrew J. Mangini, Warren, Pa., assignor to Pennsylvania Furnace and Iron Company, Warren, Pa., a corporation of Pennsylvania Application February 11, 1957, Serial No. 639,431

6 Claims. (Cl. 137—77)

This invention relates to a valve construction and particularly, to a valve and valve-operating mechanism suitable for use with fluid-carrying tanks such as transportation tanks employed for delivering fluids or liquids, including oil, asphalt, etc.

At the present time, all transportation tanks, such as those of an over-the-road vehicular type and particularly, those operating interstate, are required to meet certain standards as to construction, operation, etc. It is customary to have more than one compartment in each vehicular or trailer tank and it is required to provide one valve for the bottom of each of the compartments. It is desirable to normally operate each valve at a central station that may be remote to their respective locations. Each valve is also required by law to be so constructed or employed that it will automatically close in case of fire.

Valves of the type here involved have been operated by cables or by air lines. Individual fluid delivery pipes have been run from each valve to a common delivery pipe having a secondary or manifold valve at the rear end or side of the trailer. To unload or deliver liquid, the operator first opens the appropriate internal, primary compartment valve or valves that are located at the bottom of the tank, and then opens the manifold, secondary, outer or rear end valve. The internal valves have to automatically close in the case of fire to limit the area of conflagration.

The secondary or manifold valve is needed since the primary or compartment valves have normally been spring-actuated to a closed position; thus, they do not have a positive shut-off. However, because of its outer location for convenient manual operation, the secondary or manifold valve has been of a positive type. Systems heretofore used for the above purpose have been rather complex, expensive and not fully satisfactory. There has thus been a need for a simplified and more practical arrangement which will meet safety and law requirements.

It has thus been an object of my invention to devise a new and improved valve construction, system or arrangement which will meet major factors posed by the use of prior valve arrangements or systems;

Another object of my invention has been to simplify the manifold arrangement for a multi-compartment vehicular or transportation tank;

A further object of my invention has been to devise a shut-off and remotely-controlled valve for tank compartments which valve will be fully positive as to both its opening and closing movements, and that may be employed in a system with others in a simple manner for multiple closing movement;

A still further object of my invention has been to develop a multiple valve construction whose individual members may be positively controlled in their operation and all of whose members may in an emergency be operated simultaneously to close them automatically;

These and other objects of my invention will appear to those skilled in the art from the illustrated embodiment and the appended claims.

In the drawings, Figure 1a is a side elevation of a container or transportation tank; it is partially broken away and in section to illustrate the location, relative-positioning, and the assembled usage of a valve construction made in accordance with my invention;

Figure 1b is a continuation of Figure 1a, illustrating control means for operating the valve construction; both views are of the same scale; Figure 1a particularly illustrates the valve construction and Figure 1b particularly illustrates operating mechanism for remotely controlling the valve construction;

Figure 2 is a slightly reduced top view in partial section showing a right hand part of a valve system of my invention, operating mechanism therefore, and a common duct or manifold construction employed therewith;

Figure 3 is an end or transverse section in elevation on the scale of and taken along the line III—III of Figure 1a;

Figure 4 is a sectional fragment on the scale of and taken along the line IV—IV of Figure 1a;

Figure 5 is an end view in elevation on the scale of Figures 3 and 4 and illustrating an enclosing slide support sleeve including end closures for a valve stem of my construction;

Figure 6 is a side view in elevation on the scale of Figure 5, partially in section, taken along line VI—VI of Figure 7, and showing the valve stem employed in the construction of Figure 3;

And, Figure 7 is an end view in elevation on the same scale as Figure 6 of the valve stem of Figure 6.

In carrying out my invention, I provide a common longitudinal duct, trough or primary valve duct for the various compartments of the transportation tank, install a positively-acting and remotely-controlled valve at the bottom of each compartment, provide means for operating each valve at a remote location from the bottom of the compartments and in a convenient relationship with each other and further, provide means for, in an emergency, automatically causing all the compartment valves to simultaneously close. The delivery or opposite end of the manifold is closed off to provide a stuffing box for the valve-operating mechanism and behind the box, to provide a somewhat remotely located, valve-operating station. A secondary, common delivery or extension manifold is connected to the remote or opposite end of the primary valve manifold and may be provided with a customary type of end-positioned and operated, secondary or master valve for controlling delivery of the fluid.

A compartment control valve device of my construction is positively operated in both directions and requires no spring means for actuating it. Relatively rigid mechanical connections may be employed to operate the valve devices and without the need for any intervening cables or fluid systems. Further, although controls of compartment valve devices of my invention may and usually will be employed to manually operate the devices, the devices may be actuated by a fluid such as an air, by a hydraulic cylinder, or by an electromagnet. However, in my construction there is no dependency on such a type of actuating means, in that it may be optionally used as an end-operator, rather than required as an intervening operating agency between the valve and its controls.

Referring particularly to Figures 1 to 3, inclusive, I have, for the purpose of illustration, shown two similar primary, compartment-control or shut-off valves of my construction as employed with a pair of compartments 10a and 10b of container tank 10, such as a petroleum transportation tank. Each compartment 10a and 10b has (as shown particularly in Figure 1a) a downwardly-offset drain opening that is valve-controlled and that delivers through a top opening in a common primary, under-trough, duct or manifold portion 12 and therealong towards its opposite, rear or diverging end portion 13 (see Figure 2.)

As shown particularly in Figure 2, the portion 13 expands or diverges outwardly or backwardly from the compartment under-duct portion 12 and is of somewhat conical shape. Its back end is closed off by a stuffing box construction, and its bottom is provided with a fluid delivery opening or down-flow orifice 14. Fluid or liquid received from any of the compartments is thus delivered by the duct portion 12 to the duct portion 13 of the primary delivery duct, through down-flow orifice 14, along a short-length, tertiary manifold portion (secondary duct) 16 and its master shut-off valve 16a, and through an outlet fitting 16b that may be threaded to provide a hose mounting (see Figure 2).

As shown in Figure 1a, a down-flow cylindrical or annular ring or seating collar 11 is secured by weld metal w to connect the compartments 10a, 10b, etc., with the portion 12 of the primary under-duct, trough or manifold that projects longitudinally of the system. As shown in Figure 1a, the duct portion 12 may be closed by an end wall 12a at its front end and may be open at its other end to deliver to the diverging duct portion 13 which, in turn, has an end wall or breast plate 15 at its back end. Delivery from the enlarged duct portion 13 is through the bottom orifice or opening 14.

It will be noted that the length of the secondary duct 16 is maintained at a minimum by utilizing the greatest possible length of duct portions 12 and 13. The secondary duct or manifold, although it is positioned below the duct or manifold portion 13, is centrally mounted as to the transverse dimension of the tank 10 and is of greatly reduced size and of minimized length. As shown in Figures 1a and 3 to 7, inclusive, I provide my construction with a top-mounted, annular valve head or disc 17, and an inset gasket 18. The gasket 18, of course, will preferably be of a synthetic rubber or resilient material which is resistant to fluids to be handled, such as petroleum products.

The valve head 17 is threadably positioned at its center bore on a threaded male stem portion 20a of an upright valve stem 20 (see Figure 3). An under-disc or positioning plate 19 rests on a ledge portion 20b that is defined between the reduced threaded end portion 20a and main body portion 20c of the valve stem 20 (see also Figure 7) and projects outwardly to provide an annular rim support for a bottom or under-side of the gasket 18. As shown particularly in Figure 3, the wearing parts of each individual primary valve device may be easily repaired or replaced by working internally of the compartment 10a or 10b of the tank 10 in which it operates. The gasket 18 serves as a seating surface and has an inwardly-declining face portion 18a that seats on an upper, slightly-beveled, seating edge or surface portion of the seating ring or collar 11.

As shown particularly in Figures 3, 4 and 5, the main body portion of the valve stem 20 is of rectangular or square section and is operatively-slidably-positioned within a rectangular or square supporting box or side guide and enclosure 22. A pair of flange members 25 are welded to and extend along an under surface of collar 11 (see Figures 1 and 3). The flange members 25 are also secured to opposite sides of the closure 22 to retain it in an aligned position below the valve head 17. To control the operation of each valve, I have provided the stem 20 with through-slot surfaces 20d (see also Figures 6 and 7). The slot surfaces 20d decline towards one side of the stem and provide an internal cam or operating portion that inclines upwardly towards the other side, so as to operatively-receive an operating slide plate, means or member 30 having somewhat the shape of a parallelogram (see Figure 1a). It will be noted that the inclined surfaces 20d of the valve stem 20 incline in a substantially parallel plane with respect to the inclined surfaces of the plate member 30.

As illustrated by the full lines of Figure 1a, the valve stem 20 may be moved from a fully closed or seated (down) relationship of A to the dot and dash line, fully open or unseated (up) relationship of B, by moving the operating or slide plate 30 from right to left on a longitudinal plane. The plate 30 has a light offset 30a at its forward end so as to, in effect, latch the valve in its closed position, but without in any way interfering with its manual actuation to an open position.

The operating or slide plate 30 is carried within a centrally-slit rod or bar 31 that at one end 31a is secured as an integral part to a cross-piece or member 37, see also Figure 2. A series of longitudinally spaced-apart rivets 32, 33 and 34 (see Figure 4) serve to secure the plate 30 in position within opposed, bifurcated halves of the operating rod or bar 31 to project in an operating relationship through the stem 20, stem-supporting enclosure or guide box 22, and along pairs of oppositely-projecting, split, guide sleeves 27 and 28 (see particularly Figures 1a, 2 and 4).

As shown particularly in Figure 4, the split, guide-positioning sleeves 27 and 28 are secured by weld metal w to project from opposite closure ends of the guide box 22. As illustrated in Figures 4 and 5, the guide box 22 has end walls 22a of the same construction, as well as opposed side walls 22b of like construction as to each other. Each end wall or closure portion 22a has a vertical slot 23a to by-pass the operating plate member 30, and a central or mid, enlarged circular opening that is defined by a split sleeve or ring bearing 24. The bearing sleeves guide and support the endwise slidable movement of the slit operating rod or bar 31 and are secured in position to the end closure portions 22a by weld metal w. The maximum movement of the operating rod or bar 31 to the right of Figure 4 or backwardly of the assembly is limited by a cross pin 35 that is carried by the operating rod 31 and that projects therethrough to abut against an outer end portion of front guide sleeve 27. It will thus be noted that the end closures 22a have portions to guide the split operating rod 31 for movement at substantially an acute angle with respect to one side of the valve stem 20 and at substantially an obtuse angle with respect to an opposite side of the valve stem.

The cross connector piece or member 37 acts as intermediate trans-connector between the operating plate 30 or its operating rod 31 with respect to a remote control or secondary operating rod or bar 38. The rod 38 has threads at its forward end 38a to receive clamping nuts 39 (see Figures 1a and 2). As shown particularly in Figure 2, the rod 38 is mounted as close as possible to the mounted end portion 31a of the plate-operating rod 31 and projects backwardly and is bent outwardly so as to somewhat conform to the contour of the diverging duct portion 13.

Although in Figure 2 I have shown four remote control operating rods, 38, 38', 38" and 38''', it is apparent that any suitable number may be employed, depending upon the number of compartments in the tank and thus, the number of valves which are to be individually operated. The amount of bend, of course, will be greater in the outwardly-positioned rods 38" and 38'''. This bend or offsetting is to provide an effective operating connection of the rod to its particular cross connector 37, and in such a manner that it may be moved from the valve opening or forward position A of Figures 1a and 2 to a fully closed or lower position as represented by B of the same figure. It will be noted that any or each rod 38, 38', 38" or 38''' may be secured by an end joint (fixed or turnable) to the plate-operating split-rod 31 (for example, see turn joint 41 of Figure 1b and the fixed joint 39 of Figure 1a). The cross connector 37 is employed where transverse offsetting is needed between a set of members 31 and 38 (see Figure 2). If the connector 37 projects transversely beyond a second rod member (38', for example), it will have a loosely-fitting, by-passing, open portion for the second rod member or may be vertically offset if vertical headway is sufficient.

Since the mounting of each remote control or operating rod at the stuffing box end is the same, I will only describe the mounting of the rod 38. As shown particularly in Figure 2, the rod 38 projects through vertical back end wall 15, along the bore of a two-part spacer block 47, through a U-shaped channel 46, and has a threaded end portion 38b (see Figure 1b) that is adjustably mounted within a connector collar 41. The collar 41 has a threaded bore 41a to cooperate with threaded end 38b and a nut 40 is employed to lock the rod 38 in a properly adjusted relationship with respect to the collar 41.

A tertiary or outer operating rod 43 projects through a transversely-extending cross plate member 50 and a vertical rear end wall 49 of the stuffing box into an unthreaded bore end of the connector collar 41. It has an annular groove 43a which, with an annular groove or offset in the bore 41b, provides a seat for an annular locking ring 42. In this manner, the tertiary or outer operating rod 43 is turnably or rotatably secured within the connector collar 41 and thus, through the secondary rod 38, to the main or primary operating rod 31. This provides a turn-joint-connected operating rod means for the system, in accordance with which only the outer rod 43 is both rotatable and longitudinally adjustable in the system. The rods 38 and 31, however, are only longitudinally adjustable or movable in the system.

The tertiary operating rod 43 has a manual control hand wheel 44 and a mounting nut 45 therefor, so that its enlarged, forward-end, threaded sector 43a may be screwed into and out of a corresponding female, threaded bore 49a (see Figure 2) of the back wall 49. This provides a locking means for retaining valve head in a closed position. The threads 43a and 49a are of relatively coarse pitch and enlarged diameter to make them stronger and more wear resistant, as well as to minimize the number of turns necessary for freeing them with respect to each other. Once they have been freed, the rod 43 may be moved forwardly (or to the left of Figure 2) from the position D of that figure to a position such as represented by C, E and F. The latter is a sliding movement after the latch or lock engagement, provided by the threads 43a and 49a, has been released. The stuffing box (as shown particularly in Figure 2) has an enclosing front wall 15, opposed side wall members 51, and back wall member 49, side walls 51 may be straight and vertical to, with walls 15 and 49, define a substantially rectangular shape whose top and bottom portions may be open.

The spacer blocks 47 are of two-part or split construction and have an annular groove therebetween to receive wiping and sealing, O-ring gaskets 48. As will be apparent, the gaskets 48 will be of suitable resilient material and will be positioned to wipe the rods 38, 38', 38" and 38''' as they are moved longitudinally of the structure.

When one or more of the rods 38, 38', etc., is in a forward or valve-opening position, then for safety assurance, I have provided means for simultaneously closing all of them that are in an open position, for example, if an emergency such as a fire should occur. This means is particularly illustrated in Figures 1b and 2 and comprises, a pair of inner and outer telescopic slide sleeve members 52 and 53, and a cooperating, relatively heavy, expansion or valve-return spring or resilient element 54. The outer sleeve 53 is secured by weld metal w to project backwardly from the wall 15, while the inner sleeve 52 is secured in a similar manner to project backwardly from the web of the channel member 46 and slidably within the outer sleeve 53.

As will be noted, the spring 54, at its one end, abuts against closed forward end wall 53b of the outer sleeve 53, and for a major portion of its length, is supported by the inner wall surface of the inner sleeve 52. At its other or back end, the spring abuts against or is supported by the web of the cross channel member 46. Thus, the spring 54 will normally urge the channel 46 backwardly along the operating rods 38, 38', etc., and into pushing abutment with the connectors 41 and particularly, with the locking nuts 40. Thus, when the inner sleeve 52 is released, the spring 54 will move the channel to the right of Figure 2 or backwardly, to thus close any of the valves which may be open. The channel 46 serves as a sliding abutment means to engage abutment portions 40 of all the valve rods to simultaneously close all of the shut-off valves. Although the wheels 44 may then be manually given a turn or two to positively lock the shut-off valve heads 17 in their closed positions, the notch or offsets 30a at the forward end of the plate members 30 serve this purpose when the abutment means 46 is resiliently being held in holding engagement with the abutment portions 40. The remote location of the return spring 54 with respect to the compartments and their valves is a safety feature of the construction or system.

Figure 1b shows a control mechanism, latch or lock for the inner sleeve 52. In this connection, the sleeve has a top latching notch 52a that operates with a beveled latching end portion 56a of a latch lever or finger 56. The finger 56 may be pivoted to swing downwardly, as shown, by a pin 57. Although I have shown a heat-sensitive or fusable, headed pin or latch element 58 which will melt, for example, when the temperature rises to 160° F., I may also provide operating connections to the finger or lever 56. Normally, the finger 56 is held in its latched position by the fusable latch pin 58 which is secured at 15a within the wall 15. Once the stem or one of the heads of the pin 58 is melted, the finger 56 will be pushed out of the notch 52a by the force of the spring 54, and the spring will be free to activate or move the abutment means 46 backwardly to close all or any of the compartment or shut-off valves which are open at the time.

It will be noted that closing and opening (seating and unseating) movement of the valve head 17 is accomplished very positively and accurately, and that any desired size of opening may be attained for fluid control purposes. Also, because of the mechanical advantage of the dual-way wedging action, fluid head or pressure against the valve opening or seat from either direction will not force the valve head either open or closed. The disadvantages of a valve equipped with a spring or a flexible position-holding means are eliminated.

What I claim is:

1. In a multiple partitioned tank having a group of fluid-containing compartments and a discharge duct in an under-position with respect thereto, an improved valve construction for opening and shutting off fluid flow from an open portion of each fluid-containing compartment comprising, a valve device for each of the open portions, each valve device having an annular collar connecting the open portion of one compartment to the discharge duct and having a valve seat thereabout, a valve head positionable within the open portion and having a downwardly projecting valve stem, a valve guide connected to said collar and slidably receiving said valve stem to hold said valve stem in an operating position with respect to the valve seat of said collar, said valve stem having operating cam portions, and longitudinally-slidable cam means operatively positioned to move along said valve guide and actuate said operating cam portions to positively raise and lower said valve head with respect to said valve seat.

2. In a multiple partitioned tank having a group of fluid-containing compartments and a longitudinally-extending discharge duct communicably positioned thereunder, an improved valve construction for opening and shutting-off fluid-flow from an open portion of each fluid-containing compartment to the discharge duct comprising, a valve device for each of the open portions, each of the valve devices having an annular collar connecting the open portion of a compartment to the discharge duct and having a valve seat thereabout, a valve head positionable within said collar and having a downwardly-projecting valve stem, a valve guide connected to said collar and slidably receiving said valve stem to hold said valve head in on operating position with respect to the valve seat of said collar, said valve stem having operating cam portions, longitudinally-slidable cam means operatively positioned to move along said valve guide and actuate said operating cam portions to positively raise and lower said valve head with respect to said valve seat, a stuffing box positioned at a remote end of the discharge duct, and a rigid longitudinally-slidable valve-actuating rod operatively positioned to extend from said stuffing box along the discharge duct to said longitudinally-slidable cam means, so that said valve may be positively cammed upwardly to an open position and positively cammed downwardly to a closed position from a location remote to said valve head.

3. In a multiple partitioned tank having a group of fluid-containing compartments, an improved valve construction for operatively delivering fluid from an open end portion of each compartment which comprises, a valve device for each of the open end portions, each valve device having a collar connected to one compartment and surrounding the open end portion thereof, said collar having a valve seat and a valve guide, a valve stem operatively positioned with respect to said valve guide, a valve head having a seating surface cooperable with the seat of said collar, said valve stem being secured at one end to said valve head, said valve stem having inclined cam operating portions therealong, plate means having inclined cam surfaces positioned to cooperatively move longitudinally through the valve stem and along the inclined cam operating portions of said valve stem for positively actuating said valve stem to open and close said valve head with respect to said valve seat, and rod means connected to said plate means to move said plate means longitudinally in a plane that is transverse to the longitudinal axis of said valve stem.

4. In a multiple partitioned tank having a group of fluid-containing compartments and a longitudinally-extending discharge duct positioned below, an improved valve construction for operatively delivering fluid from an open end portion of each compartment to said discharge duct which comprises, a valve device for each of the open end portions, each valve device having a collar conected to each compartment and circumscribing the open end portion thereof, said collar having a valve seat and a valve guide, a valve stem operatively positioned within said valve guide, a valve head having a seating surface cooperable with the valve seat of said collar, said valve stem being secured at one end to said valve head, said valve stem having inclined operating portions therealong, plate means having inclined cam surfaces positioned to operatively move longitudinally through the valve stem and along the inclined cam operating portions of said valve stem to positively actuate said valve stem for opening and closing said valve head with respect to said valve seat, a stuffing box positioned at a discharge end of the discharge duct, a valve actuating rod extending from said stuffing box along the discharge duct and operatively connected to said plate means, an abutment portion on said actuating rod, a sliding abutment means circumscribing the activating rod of each valve device, said sliding abutment means being held in a resiliently-latched relationship by a fusible latch, and said abutment means being resiliently moved forwardly into engagement with the abutment portion of the actuating rod of each valve device by a resilient member within said sliding abutment means to positively actuate the rod and close each open valve device when the ambient temperature is raised sufficiently to fuse said fusible latch.

5. In a multiple partitioned tank having a group of fluid-containing compartments and a longitudinally-extending discharge duct positioned thereunder, an improved valve construction for operatively delivering fluid from an open end portion of each compartment which comprises, a valve device for each of the open end portions, each valve device having a collar connected to one compartment and surrounding the open end portion thereof, said collar having a valve seat and a valve guide, a valve stem operatively positioned with respect to said valve guide, a valve head having a seating surface cooperable with the seat of said collar, said valve stem being secured at one end of said valve head, said valve stem having inclined cam operating portions therealong, plate means having inclined cam surfaces positioned to cooperatively move longitudinally through the valve stem and along the inclined cam operating portions of said valve stem for positively actuating said valve stem to open and close said valve head with respect to said valve seat, rod means connected at one end to said plate means to impart longitudinal movement thereto, a stuffing box connected to one end of the discharge duct, an opposite end of said rod means being mounted within said stuffing box, and means within said stuffing box for locking said rod means in a valve-closing position and for releasing said rod means from the valve-closing position.

6. In a multiple partitioned tank having a group of fluid-containing compartments, an improved valve construction for operatively delivering fluid from an open end portion of each compartment which comprises, a valve device for each of the open portions, each valve device having a collar surrounding the open portion and connected to the compartment, said collar having a valve seat and a valve guide, a valve stem operatively positioned within said valve guide, a valve head having a seating surface to cooperate with the seat of said collar and secured to one end of the valve stem, said valve stem having inclined cam operating portions therealong, plate means having inclined cam surfaces positioned to cooperatively move longitudinally along the inclined cam operating portions of the valve stem for positively actuating said valve stem to open and close said valve head with respect to said valve seat, a fluid-delivery duct connected to the open delivery portion of each compartment, each said valve device being positioned between the open end portion of its associated compartment and said duct, said duct extending to a somewhat remote location with respect to said compartment, an operating station at such remote location, mechanical operating means connected to each said plate means to positively mechanically and independently operate it to open and close each said valve head from the control station, said operating means being mounted so that a plurality of valve heads may be opened at the same time, and an under-duct connected to receive fluid from the remote end of said delivery duct and projecting centrally along and therebeneath to deliver fluid outside the tank.

References Cited in the file of this patent

UNITED STATES PATENTS

| 56,500 | Kimball et al. | July 17, 1866 |
| 942,887 | Case | Dec. 14, 1909 |
| 1,737,929 | Libby | Dec. 3, 1929 |
| 1,745,696 | Jordan | Feb. 4, 1930 |
| 1,845,817 | Shield | Feb. 16, 1932 |
| 1,932,972 | Jensen | Oct. 31, 1933 |
| 2,078,384 | Jefferson | Apr. 27, 1937 |
| 2,301,821 | Scott | Nov. 10, 1942 |

FOREIGN PATENTS

| 2,431 | Great Britain | July 11, 1874 |
| 373,160 | Germany | Apr. 9, 1923 |

UNITED STATES PATENT OFFICE

CERTIFICATE OF CORRECTION

Patent No. 2,924,231                      February 9, 1960

Andrew J. Mangini

It is hereby certified that error appears in the printed specification of the above numbered patent requiring correction and that the said Letters Patent should read as corrected below.

Column 7, line 13, claim 2, after "valve" insert -- head --.

Signed and sealed this 12th day of July 1960.

(SEAL)

Attest:

KARL H. AXLINE
Attesting Officer

ROBERT C. WATSON
Commissioner of Patents